United States Patent [19]

Fotiou

[11] Patent Number: 5,368,885
[45] Date of Patent: Nov. 29, 1994

[54] METHOD OF APPLYING COATING POWDER AND GLASS FLAKE TO PRODUCE A GLASS FLAKE-CONTAINING FINISH

[75] Inventor: James G. Fotiou, Reading, Pa.

[73] Assignee: Morton International, Inc., Chicago, Ill.

[21] Appl. No.: 78,882

[22] Filed: Jun. 16, 1993

[51] Int. Cl.⁵ .............................................. B05D 5/06
[52] U.S. Cl. ................................... 427/195; 427/201; 427/204; 427/486
[58] Field of Search ............... 427/195, 201, 204, 205, 427/470, 485, 486, 203; 525/934; 524/904

[56] References Cited

U.S. PATENT DOCUMENTS

| | | | |
|---|---|---|---|
| 3,843,571 | 10/1974 | Fitzgerald | 260/17 R |
| 3,932,320 | 1/1976 | Camelon et al. | 260/17 R |
| 4,025,665 | 5/1977 | Hannon | 427/195 |
| 4,093,571 | 6/1978 | Gordon et al. | 260/2.5 B |
| 4,499,143 | 2/1985 | Panush | 428/336 |
| 4,605,687 | 8/1986 | Panush | 523/171 |
| 4,849,283 | 7/1989 | Porter, Jr. et al. | 427/407.1 |
| 5,035,920 | 7/1991 | Smrt et al. | 427/202 |
| 5,187,220 | 2/1993 | Richart et al. | 524/441 |

FOREIGN PATENT DOCUMENTS

| | | | |
|---|---|---|---|
| 53-125444 | 11/1978 | Japan | 427/203 |
| 01-236284 | 9/1989 | Japan . | |

*Primary Examiner*—Terry J. Owens
*Attorney, Agent, or Firm*—Wayne E. Nacker; Gerald K. White

[57] ABSTRACT

To form a sparkle finish by powder coating, an opaque initial layer is first applied to a substrate, e.g., by powder coating. Then a mixture of glass flake and clear coating powder is prepared by blending. This mixture is then applied to a substrate, e.g., electrostatically, and heated to fuse and/or cure the coating powder.

6 Claims, No Drawings

METHOD OF APPLYING COATING POWDER AND GLASS FLAKE TO PRODUCE A GLASS FLAKE-CONTAINING FINISH

The present invention is directed to producing a sparkle finish by a powder coating method and more particularly to producing a sparkle finish using coating powder containing glass flakes.

BACKGROUND OF THE INVENTION

The conventional method of producing a sparkle finish using a powder coating is to add metal flake, e.g., aluminum, to the coating powder. As one method of producing a powder coating, metal flake is admixed with the coating powder and this admixture is applied, e.g., electrostatically, to a substrate. An improvement in this method is adhering the metal flake to the coating powder, such as is taught in U.S. Pat. No. 4,197,351.

There exist concern with the inclusion of metal flake in coating powders, particularly coating powders which are to be applied electrostatically, from a safety standpoint. Conductivity through the metal flake may cause shock, and, if carelessly used, may even result in dust explosions. Accordingly, there is a desire to provide a sparkle finish using other material than metal.

It was attempted to use glass flakes to produce a sparkle finish. Glass flakes are too fragile to be adhered to coating powders by conventional methods. Accordingly, it was attempted to admix glass flake with coating powder and apply this coating to a substrate. Essentially no sparkle effect was achieved.

The present invention is directed to using glass flake in a powder coating process to achieve a sparkle finish.

SUMMARY OF THE INVENTION

In accordance with the present invention a method is provided for providing a sparkle finish to a substrate. An initial coating is applied to a substrate, preferably, but not necessarily, by powder coating. To the initial coating is applied a mixture of a clear, unpigmented coating powder and glass flake. The substrate is heated to fusion and/or curing temperature of the coating powder. The glass flake in the clear coat gives a sparkle finish, which is enhanced by the initial coat, particularly if the initial coat is of a strong or dark color.

DETAILED DESCRIPTION OF CERTAIN PREFERRED EMBODIMENTS

This method of this invention is applicable to powder coating using any coating powder, provided the coating powder can form a clear coat. Coating powders useful in this invention include thermoplastic coating powders, such as vinyl powders, polyolefinic powders, nylon powders, polyester powders, etc. and thermoset powders including cross-linked polyesters, acrylics, epoxies, amino resins, etc. Also, the coating powder may contain a mixture of two or more resins.

Glass flake useful in the present invention has an aspect ratio (ratio of breadth (shortest dimension of flat surface) to thickness) of between about 3 and about 200, preferably between about 10 and about 50. The glass flake ranges in thickness from between about 0.1 to about 20 microns, preferably between about 1 and about 14 microns. The greatest dimension (length) of the glass is between about 10 and about 200 microns, preferably between about 30 and about 100 microns. Preferably, the length is no more than about 30% greater than the breadth. The glass flake may be colorless or colored. For special effects, more than one color glass flake may be used. Preferred colored glass flakes have a coating which generates a color by light interference. Such coatings might, for example, be oxides of titanium, zirconium or zinc.

In accordance with the invention, an initial opaque coating is applied to a substrate, typically a metal substrate. The initial coating is preferably applied by powder coating a pigmented coating powder onto a substrate, e.g., electrostatically, and fusing and/or curing the same by heating the substrate in a conventional manner. However, the initial opaque coating may be applied by any means known in the art. The mixture is generally provided in an amount to form a layer which is at least about 1.5 mil thick. This initial coating, along with the glass flake, define the final appearance of the finish.

A outer coat is then applied by powder coating using a coating powder mixture which is a mixture of a clear coating powder and the glass flake. By clear coating powder is meant a coating powder which is free of or substantially free of pigments or filler, although it can contain such minimal amount of pigment or filler such that the pigment or filler will not significantly detract from the desired sparkle finish. An amount of glass flake is added to the clear coating powder so as to obtain the desired amount of sparkle in the coating powder. Enough glass flake may be added in an amount to provide just a touch of sparkle, e.g., in an amount as low as about 0.1 wt % relative to the weight of the clear coating powder. Typically at least about 1% by weight relative to the weight of the coating powder will be added. Generally, there is little added effect after about 15% glass by weight relative to the clear coating powders. Generally, the larger the flakes, the less amount by weight of the coating powder need be added to achieve the desired effect. If the flakes are colored, the color of the finish will be a combination of the color of the initial coating and the color of the flake. For example, using a black initial coating and blue flake in the clear coat will achieve a black finish with a dramatic blue luminescence.

In chemical composition, the clear coating powder is typically selected to match the chemistry of the pigmented initial coat. That is, the resin or resins of the clear coating powder is preferably the same resin or resins used in the initial coating. Otherwise, there tends to be either poor adhesion between the two coats or there tends to be cracking, due to differential thermal expansion and contraction in the fusion and/or curing processes. The glass/coating powder mixture is applied to the substrate having the pigmented initial coating in a usual manner, e.g., electrostatically. The substrate is heated during application and/or afterwards to fuse and/or cure the clear coating powder. The glass in the coating powder provides a sparkle or luminescence which interacts with the background color of the initial coat.

While the opaque coat is described herein as an "initial coat", it is to be understood, that there could be any number of coats previously applied to the substrate. The "initial coat" is that layer under the glass/clear coat which interacts with the glass to form the final outward appearance of the finish.

The invention will now be described in greater detail by way of specific examples.

EXAMPLES

To rolled steel panels, known as Q panels, powders were applied with an electrostatic spray gun. The sprayed panels were cured in an electric oven with a cure cycle of 400° F. (204° C.) for ten minutes. This provided a pigmented base coat.

To produce the sparkle-containing coat, glass flake was added to clear coating powder and bag-blended with vigorous shaking. The base-coated panel was preheated at 400° F. for 1 min. This postblend was then applied and cured in the manner of the basecoat.

In comparative examples, glass flake was admixed with the pigmented coating which comprised the basecoat in the samples according to the present invention.

| | Composition | Appearance |
|---|---|---|
| 1. | Corvel* Black Polyester (CBP) 20-7007 | Glossy Plain Black (basecoat only) |
| 2. | CBP containing 8% EM 141 270 (blue) | Black, Very Low Sparkle (comparative) |
| 3. | CBP; Corvel Clear Polyester (CCP) 23-9030 with 2% EM 21-3461 (colorless) | Black with iridescent sparkle |
| 4. | CBP; CCP with 10% EM 141 270 (blue) | Black with iridescent blue sparkle |
| 5. | CBP; CCP with 5% EM 141 268 (red) | Black with iridescent red sparkle |
| 6. | CBP; CCP with 5% EM 141 270 2% EM 141 268 | Black with iridescent red and blue sparkle |
| 7. | Corvel Low Gloss Black Epoxy (CBE) 10-7059 | Non-Glossy, Plain Black (basecoat only) |
| 8. | CBE with 8% EM 141 270 | Black, Very Low Sparkle (comparative) |
| 9. | CBE; Corvel Clear Epoxy with 8% EM 141 270 | Black, iridescent blue sparkle |

*a registered trademark of Morton International, Inc.

* a registered trademark of Morton International, Inc.

What is claimed is:

1. A method of providing a sparkle finish to a substrate comprising
   applying an initial opaque coating to a substrate,
   mixing a clear coating powder with between about 0.1 and about 15 wt.% glass flake to produce a glass flake/coating powder mixture,
   applying said mixture over said initial opaque coating, and
   heating said mixture to fuse and/or cure said clear coating powder to form a finish in which said glass flake provides sparkle.

2. A method according to claim 1 wherein said initial opaque coating is applied to said substrate by powder coating.

3. A method according to claim 1 wherein said glass flake is colorless.

4. A method according to claim 1 wherein said glass flake is colored.

5. A method according to claim 1 wherein said glass flake is a mixture of glass flake of at least two different colors.

6. A method according to claim 1 wherein said initial opaque coating comprises a thermoplastic or thermoset resin, and said clear coating powder comprises a thermoplastic or thermoset resin that is substantially the same as said resin of said initial opaque coating.

* * * * *